B. LJUNGSTROM.
TOOTHED GEARING FOR STEAM TURBINES.
APPLICATION FILED MAR. 14, 1913.

1,130,748.  Patented Mar. 9, 1915.

WITNESSES:
H. F. Rueth
G. M. Copenhaver,

INVENTOR
Birger Ljungström
BY
W. H. Babcock
ATTORNEYS

UNITED STATES PATENT OFFICE.

BIRGER LJUNGSTRÖM, OF STOCKHOLM, SWEDEN, ASSIGNOR TO AKTIEBOLAGET LJUNGSTRÖMS ÅNGTURBIN, OF LILJEHOLMEN, SWEDEN.

TOOTHED GEARING FOR STEAM-TURBINES.

1,130,748.  Specification of Letters Patent.  Patented Mar. 9, 1915.

Application filed March 14, 1913.  Serial No. 754,331.

*To all whom it may concern:*

Be it known that I, BIRGER LJUNGSTRÖM, a subject of the King of Sweden, and a citizen of Sweden, residing at 18 Grefmagnigatan, Stockholm, in the Kingdom of Sweden, have invented certain new and useful Improvements in Toothed Gearings for Steam-Turbines, of which the following is a specification.

The present invention relates to a toothed gearing for steam-turbines of the double rotation type, having two shafts in the same axial line and especially to those which have a high speed of rotation and are adapted to drive propellers.

This invention relates especially to a known construction, in which the said two shafts drive two wheels on a common shaft by means of an even and an odd number of toothed gear wheels and consists in arranging the wheels on the said common shaft so as to embrace a smaller central wheel, which meshes with a wheel on the driven shaft. By this arrangement a very concentrated and stable form of gearing is obtained.

Figure 1:
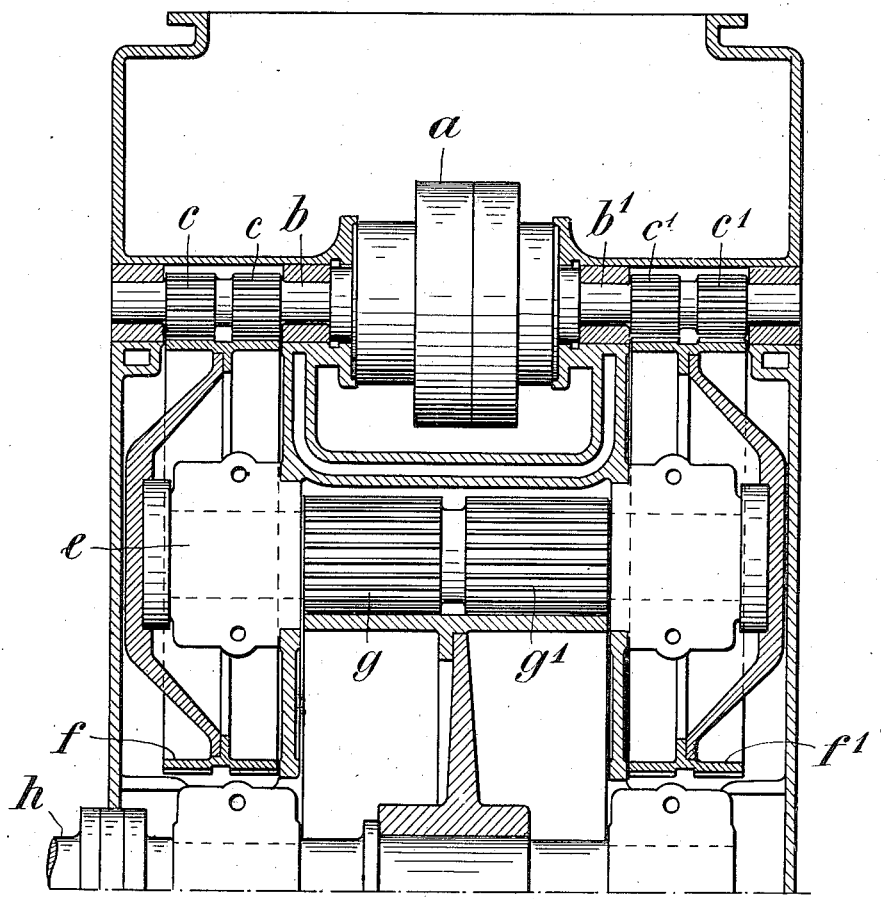
Figure 2:
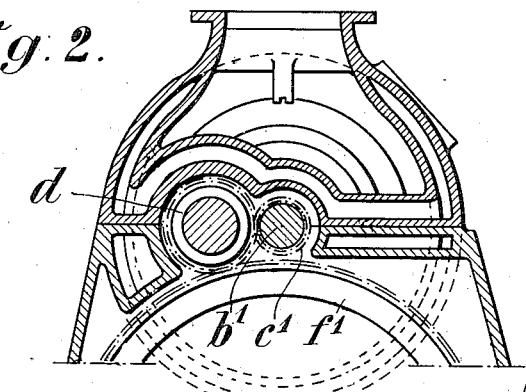

An embodiment of the said invention is shown in Figures 1 and 2 of the accompanying drawings in cross and longitudinal section respectively.

$a$ indicates the turbine, which, in the embodiment, as shown is of the double rotating type, so that the two shafts $b$ and $b'$ rotate in opposite directions. On these shafts toothed wheels $c$, $c'$ are mounted, which mesh with the larger toothed wheels $f$, $f'$ mounted on a common shaft $e$, the wheel $c$ gearing directly with wheel $f$, while wheel $c'$ is connected with wheel $f'$ by means of the intermediate wheel $d$. The wheels $f$, $f'$ will therefore rotate in the same direction and with the same speed.

Between the wheels $f$, $f'$ smaller toothed wheels $g$ $g'$ which are substantially a single one are mounted, said wheels $g$, $g'$ turning together and engaging the large toothed wheel $i$, mounted on the propeller shaft or a like shaft $h$. This wheel $i$ is placed between the wheels $f$, $f'$, which arrangement and the perfectly symmetrical arrangement of the other gear wheels above described make the entire set of gearing very compact. Between the shafts $b$, $b'$ on the one hand, and the shaft $h$ on the other hand, the number of toothed wheels will be odd on the one side and even on the other side.

Having now described and ascertained the nature of my said invention what I claim is:—

In gearing for steam-turbines of the double rotating type, a pair of shafts in the same axial line but rotating in opposite directions, a pair of wheels respectively mounted on said shafts and turning therewith, a shaft having two large wheels mounted thereon and turning therewith, one of which wheels directly meshes with one of the pair of wheels first mentioned, an additional gear wheel transmitting motion from the other wheel of the first pair to the corresponding wheel of the second pair, a wheel smaller than those of the second pair arranged between them on the same shaft to turn therewith, a driven shaft and a wheel mounted thereon and turning therewith engaging said smaller wheel and arranged between and in proximity to the wheels of the second pair.

In testimony whereof I have affixed my signature in presence of two witnesses.

BIRGER LJUNGSTRÖM.

Witnesses:
GRETA PRICU,
IRMA GRAAF.